March 11, 1941.  C. A. BREWER  2,234,463
CONTROL SYSTEM FOR AUTOMOTIVE VEHICLES
Filed April 24, 1937
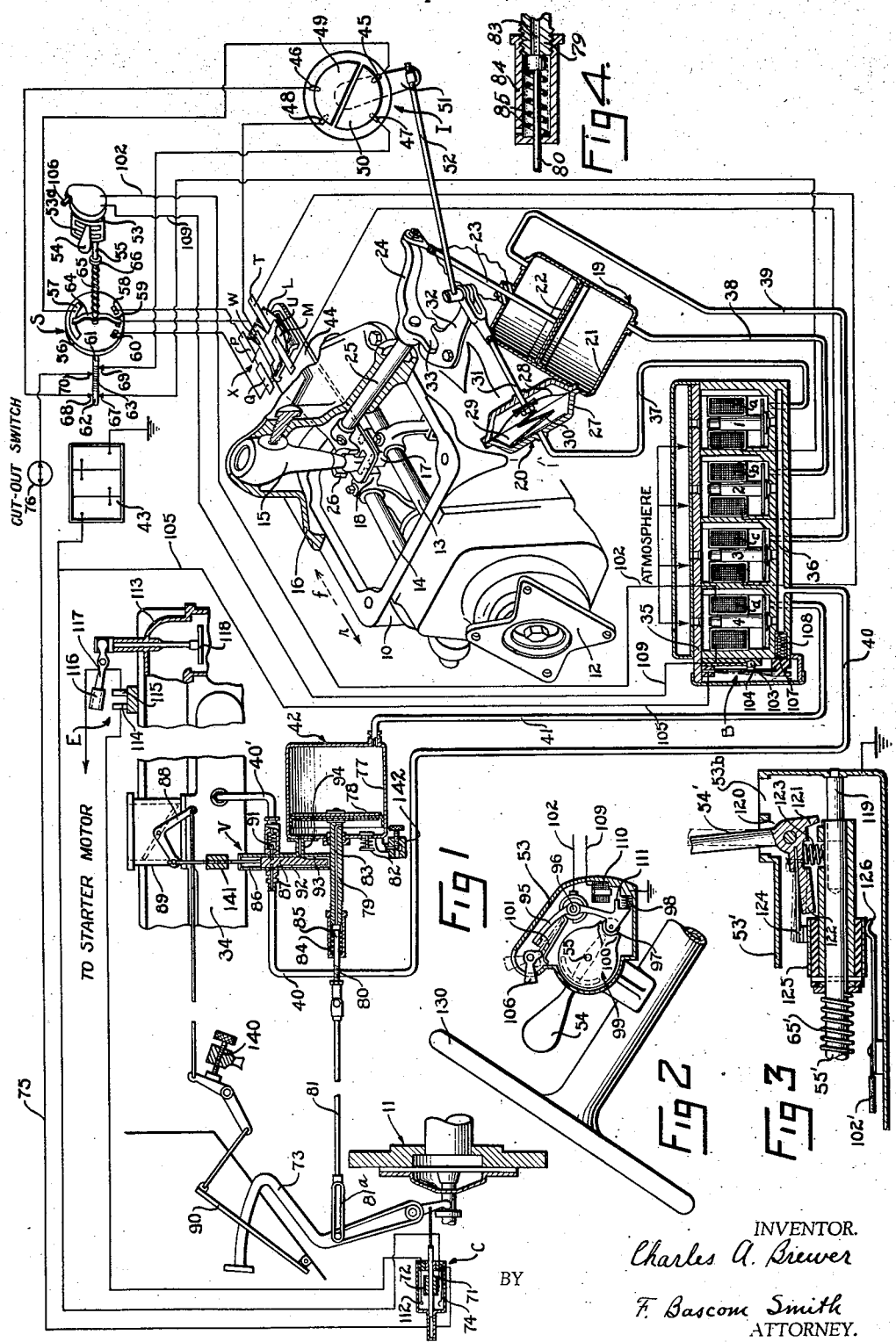
INVENTOR.
Charles A. Brewer
BY F. Bascom Smith
ATTORNEY.

Patented Mar. 11, 1941

2,234,463

UNITED STATES PATENT OFFICE 2,234,463

CONTROL SYSTEM FOR AUTOMOTIVE VEHICLES

Charles A. Brewer, Noroton Heights, Conn., assignor of one-half to Philip J. Kury, Arverne, N. Y.

Application April 24, 1937, Serial No. 138,783

7 Claims. (Cl. 192—.01)

This invention relates to automotive vehicles and more particularly to means for controlling and coordinating the operations of various control and power transmitting mechanisms of the vehicle.

It has been heretofore proposed to provide power means for actuating the change speed gears of the transmission of an automotive vehicle and to provide power means for disengaging and controlling the engagement of the clutch mechanism thereof, but no completely satisfactory means have, within applicant's knowledge, been provided for properly coordinating the operations of said two power means. In systems of this character heretofore provided, the mode of operation of the vehicle has been so altered with respect to common practice that the driver is often confused. The clutch operating means in most prior systems is rendered operative to disengage the clutch at times when clutch disengagement is unnecessary and, in fact, undesirable, such as when it is desired to employ the vehicle engine as a braking medium for retarding the motion of the vehicle. Some of the prior gear shifting mechanisms have been so constructed that the position of the control or gear selection lever is not necessarily indicative of the actual position of the gears so that the driver is not at all times aware of the position of the gears.

It is accordingly one of the objects of the present invention to provide novel control means whereby the transmission gears and the clutch of an automotive vehicle may be power operated in proper time relation and sequence with respect to one another.

Another object of the invention is to provide novel means for controlling an automotive vehicle wherein power means are employed for actuating the clutch and for shifting the gears, the sequence of events being the same as when the parts are manually actuated, so that the driver is at all times aware of the position of the parts.

Still another object of the invention is to provide novel power actuated apparatus for operating the clutch and gear shifting mechanisms of an automotive vehicle and novel control means therefore whereby disengagement of the clutch is insured while the gears are being shifted.

A further object is to provide novel means for rendering the control means of a power operated gear shifting mechanism inoperative when the vehicle motor is stopped or when the engine throttle is in open position.

Still another object is to provide control mechanism including novel switch means whereby power means for disengaging the clutch are rendered operative only when the engine throttle is in closed position and such operation is willed by the operative.

Another object is to provide novel switch control means whereby power means for shifting the gears and power means for operating the clutch of an automotive vehicle are rendered operable by a common control member.

A still further object is to provide novel means for maintaining a control circuit of an automotive vehicle in open condition when the engine is in operation.

The above and further objects and novel features of the invention will more fully appear from the following detailed description when the same is read in connection with the accompanying drawing. It is to be expressly understood, however, that the drawing is for the purpose of illustration only and is not intended to define the limits of the invention, reference being primarily had for this latter purpose to the appended claims.

In the drawing, wherein like reference characters refer to like parts throughout the several views, Fig. 1 is a diagrammatic illustration, partly in section and with parts removed, showing the transmission and clutch mechanism of an automotive vehicle in combination with one form of control means therefor embodying the present invention;

Fig. 2 is an end elevation, with parts of the casing removed, of one form of the novel switch which may be employed in carrying out the present invention;

Fig. 3 is a side elevation, partly in section and with parts broken away, of another form of a switch which may be employed; and, Fig. 4 is a sectional detail view on an enlarged scale of valve means employed in the structure of Fig. 1.

Referring more particularly to the drawing, one embodiment of the present invention is illustrated, by way of example, in combination with an accelerator, a change speed transmission and a clutch of the types employed in substantially all modern automobiles. In the form shown, the transmission gears (not shown) are housed in a casing 10, said gears being adapted in a manner well known in the art to be driven by the vehicle engine through a clutch mechanism 11 and being effective, in turn, to transmit rotary motion at varying speeds to a drive shaft (not shown) adapted to be connected thereto at flange 12.

For the purpose of shifting said gears from and into the conventional high, second, low, reverse and neutral positions, there is provided means comprising a pair of parallel shifting rails 13 and 14, each of which has a neutral, a forward and a rearward position. A shifting lever 15 is mounted in the upper portion or cover plate 16 of housing 10 for universal movement and is adapted to selectively engage forks 17 and 18 which are secured to rails 13 and 14, respectively, said forks constituting means whereby said rails and, hence, the transmission gears may be shifted to the desired position by movement of lever 15. In view of the fact that any of the well-known forms of transmissions may be employed in carrying out the present invention and in view of the fact that the construction and operations of said transmissions are well known in the art, it is believed to be unnecessary to describe and illustrate the same in more detail, said transmission, per se, constituting no part of the present invention.

Power means are provided for shifting the transmission gears into the conventional positions above noted and, in the illustrated embodiment, said means are constituted by two fluid-operated, differential-pressure motors 19 and 20. Motor 19 comprises a double-ended cylinder 21 and a piston 22 operable in said cylinder, said piston being connected by means of a piston rod 23 to a crank arm or lever 24 which is rigidly secured to and extends radially from a shaft 25. Said shaft is slidably and rotatably mounted in a cover plate 16 and is provided at its inner end with a member 26 (shown with parts cut away) which projects downwardly from and beyond the end of shaft 25 and is provided with an opening adapted to slidably receive a bulbous portion of lever 15, the points of contact between member 26 and lever 15 being eccentric with respect to the axis of rotation of shaft 25. When piston 22 moves to the left and downwardly, as viewed in the drawing, from the illustrated or neutral position thereof, shaft 25 is rotated in a clockwise direction and is effective through the swinging action of member 26 to move the lower end of lever 15 rearwardly, i. e., in the direction indicated by arrow r. When said piston moves in the other direction, shaft 25 is rotated in a counter-clockwise direction and is effective to move the shift lever forwardly, as indicated by arrow f.

Motor 20 is provided for shifting lever 15 laterally and, in the form shown, the same is of the fluid pressure operated diaphragm type including a casing member 27 and a flexible diaphragm 28 secured together to form an expansible and contractible fluid tight chamber 29 in which a spring 30 is interposed between said member and diaphragm for normally maintaining the chamber in expanded condition. Diaphragm 28 is connected by means of a rod 31 to a pivotally mounted bell crank lever 32, the free arm of which is bifurcated and engages a lug 33 that is formed integrally with lever 24 and extends radially from shaft 25. The pivotal movement of lever 32 is thus effective to move shaft 25 axially and, hence, move the lower end of lever 15 into selective engagement with forks 17 and 18, said lever being normally held by spring 30 in operative engagement with fork 18. When chamber 29 is evacuated, in a manner to appear hereafter, diaphragm 28 will be moved to the left, as viewed in the drawing, by atmospheric pressure and, hence, move lever 15 into operative engagement with fork 17.

Any suitable means may be provided for effecting a differential between the pressures acting on opposite sides of piston 22 and diaphragm 28 for moving the same in properly timed relation to shift the transmission gears in the desired manner. In the embodiment illustrated, motors 19 and 20 are connected, through a novel electrically operated control unit, to a suitable source of suction, such as the intake manifold 34 of the vehicle engine (not shown). Said control unit comprises four double-ended solenoid valves 1, 2, 3 and 4, each mounted in a separate compartment of a casing 35, said compartments each having an atmosphere inlet in the top thereof and a passage communicating with a suction chamber 36 in the bottom thereof, as viewed in the drawing. Valves 1, 2, 3 and 4 are normally held by gravity in position for closing the passages between said compartments and chamber 36 and are adapted to be electro-magnetically lifted to simultaneously open the suction passages and close the air inlets when coils $a$, $b$, $c$ and $d$, respectively, surrounding the valves are energized. Three of said compartments have constant communication with chamber 29 of motor 20 and the opposite ends of cylinder 19 through conduits 37, 38 and 39, respectively, and chamber 36 communicates with intake manifold 34 through conduits 40, 40' between which an accelerator actuated valve V, to be hereinafter described, is preferably interposed. The fourth compartment of casing 35, which houses valve 4, is connected by means of a conduit 41 to a fluid pressure motor 42 which is provided for controlling the engagement and disengagement of clutch 11, in a manner which will hereinafter appear.

Switch means are provided for controlling the flow of electrical energy from a suitable source, such as a storage battery 43 to solenoids $a$ to $d$, inclusive, and, hence, for controlling the operation of motors 19, 20 and 42, said switch means including a selector switch S, an interlock switch I, and a switch X actuated by shift lever 15. The latter switch comprises five stationary contact bars P, Q, T, U and W and a pair of three-fingered contacts L and M, the latter contacts being insulated from each other and mounted on and insulated from a sliding plate 44. Said plate extends into transmission casing 10 and has a slot through which the lower end of shift lever 15 projects whereby said plate is adapted to be moved forwardly and rearwardly with said lever but is unaffected by lateral movement thereof. The contacts of switch X are so arranged that, when lever 15 is in its central or neutral position, as illustrated in the drawing, the fingers of sliding contact L will engage contact bars P and T and contact M will engage bars U and Q. When lever 15 is in its forward position, i. e., when the transmission is in low or high gear, contact L engages only bar T, whereas the three fingers of contact M engage all three bars U, W and Q. When the shift lever is in its rearward position, i. e., when the transmission is in reverse or second gear, the three fingers of contact L engage bars P, W and T while contact M engages only bar U.

Interlock switch I is a two-position switch having four stationary contacts 45, 46, 47 and 48 and a rotatable element comprising a pair of conductors 49 and 50 insulated from one another and adapted to bridge certain of said stationary contacts. Element 49, 50 is provided with an arm 51 which is connected by a link 52 to rod 31 whereby motor 20 is effective to move said element from one of its positions to the other. With the parts in the normal position illustrated, contacts 45 and 47 are bridged by plate 50 and contacts 46 and 48 are bridged by plate 49. When chamber 29 is evacuated for moving shift lever 15 to the right into engagement with fork 17, element 49 will bridge contacts 45 and 46, and element 50 will bridge contacts 47 and 48.

Selector switch S comprises a housing 53 having an H-shaped opening 53a in a wall thereof and a lever 54 slidably extending through said opening and secured at its inner end to a rod 55 which projects at right angles therefrom and is mounted for limited angular and axial movement. Handle or lever 54 may thus be moved from its neutral position into each of the four legs of opening 53a, said positions corresponding to the four conventional speeds or gear ratios ordinarily provided in automobiles. Rod 55 slidably extends through a stationary insulator 56 on which an elongated arcuate contact strip 57 and three spaced contacts 58, 59, and 60 are mounted. The free end of rod 55 is provided with a pair of insulating sleeves 61 and 62 and a conducting sleeve 63 therebetween. A conducting bar 64 is slidably mounted on rod 55 for rotation therewith and is yieldingly held in two-point engagement with member 56 by a spring 65 interposed between said bar and a collar 66 on said rod. One end of bar 64 has constant engagement with arcuate contact 57 and the other end selectively engages contacts 58, 59 and 60, depending on the position of shift control lever 54. When rod 55 is in its normal neutral position, as illustrated in the drawing, i. e., when the same is held toward the right by spring 65, a pair of stationary contacts 67 and 68 slidably engage insulating sleeve 62 and a contact 69 slidably engages conductor sleeve 63. When said rod is moved to the left by pressure on lever 54, sleeve 63 moves into electrical engagement with contacts 67 and 68 and insulating sleeve 61 moves into engagement with contact 69. A stationary contact 70 has constant engagement with sleeve 63.

Suitable electrical connections, including switches S, I and X, are provided for connecting solenoid coils a, b and c to battery 43. As shown, one terminal of battery 43 is connected to ground and the other terminal is connected to a spring contact 71 of a clutch operated switch C which comprises a tubular conducting member 72 operatively connected to a pedal 73 that is provided for actuating clutch 11. Member 72 has constant engagement with contact 71 and is adapted to engage a second contact 74 when the clutch is disengaged. The latter contact is connected by a lead 75 in which a cut-out switch 76 is preferably provided to a contact 70 of switch S. Contact 67 is directly connected to one end of solenoid coil a and one end of each of solenoid coils b and c is directly connected to stationary bars U and T, respectively, of switch X. The other ends of said solenoid coils are connected to ground through casing 35. Bars P and Q of switch X are connected to contacts 58 and 60, respectively, and bar T is connected to both contact 59 of switch S and contact 48 of interlock switch I. Contacts 45, 46 and 47 of the latter switch are directly connected to contacts 67, 68 and 69, respectively, of switch S.

Motor 42, which is provided for disengaging clutch 11, and hence, for actuating switch C, preferably comprises a double-ended cylinder 77 in which a piston 78 is adapted to reciprocate, said piston being connected by means of a piston rod 79 and connecting links 80 and 81 to pedal 73. A slip joint connection 81a is provided between rod 81 and pedal 73 in order to permit said pedal to be manually actuated independently of motor 42. One end of cylinder 77 may be connected to intake manifold 34 through conduits 40, 40', valve 4, and conduits 41 for moving piston 78 to the right and disengaging the clutch. Atmosphere is admitted to the opposite end of cylinder 77 during the clutch disengaging movement of piston 78 through a check valve 82.

The engaging movement of the clutch is also controlled by motor 42, and, to this end, valve means are provided for controlling the efflux of air from the left end of cylinder 77 whereby the movement of the clutch elements may be retarded or stopped upon engagement of said elements and, thereafter, permitted to engage at a speed determined by the position of the accelerator. In the embodiment illustrated, piston rod 79 has a central passage 83 therein which communicates with the interior of cylinder 77 and is closed at its outer end by a valve head on the inner end of link 80. Piston rod 79 and said link are operatively and flexibly connected to each other by means of a hollow sleeve 84 that threadedly engages said rod and houses a spring 85 which tends to hold the adjacent ends of said rod and link together for closing the outer end of passage 83. When the clutch is being engaged under the tension of the usual clutch spring (not shown), the resistance of piston 78 to movement, which resistance is created by the compression of air trapped in the left end of cylinder 77, causes spring 85 to yield and permit air to escape through passage 83. The instant the driving elements of the clutch engage, however, the compression of spring 85 is relieved and motor 42 becomes effective to stop or retard further movement of said elements into driving engagement.

Further efflux of air from the left end of cylinder 77 may be controlled by a suitable bleed valve 142 which may be adjusted to closed position, but, preferably, said efflux is controlled by accelerator operated valve V whereby slow or rapid clutch engagement may be obtained depending upon the position of the accelerator and, hence, in a degree upon the speed of the engine and the vehicle. In the form shown, valve V also controls the vacuum connection to chamber 36 of the control unit, thereby preventing disengagement of the clutch and shifting of the gears when the accelerator is not in released position. Said valve is preferably of the piston type and comprises a cylindrical casing 86 in which a piston valve member 87 is slidably mounted. Member 87 is connected to one end of a bell crank lever 88 which is connected at its fulcrum to the butterfly valve of a carburetor 89 and at its other end to a suitable linkage which includes accelerator pedal 90.

Valve piston 87 has an annular groove adjacent one end thereof which registers with and connects conduits 40 and 40' when pedal 90 is released, thereby connecting manifold 34 and chamber 36 of the control unit. A suitable one-way valve, such as a ball check valve 91, may, but need not necessarily, be provided in conduit 40' to prevent loss of vacuum in chamber 36 and power unit 42 in the event the pressure in manifold 34 should rise for some reason when it is desired to maintain clutch 11 in disengaged position. When accelerator 90 is depressed, a longitudinally extending slot 92 in the side of piston 87 is brought into communication with conduit 40 to admit atmospheric pressure to chamber 36 and a tapered slot 93 is brought into communication with a conduit 94 that connects power cylinder 77 and valve cylinder 86 thereby providing a variable outlet from the left end of said power cylinder to atmosphere. By reason of the taper of slot 93, the rate of efflux of air therethrough from cylinder 77 and, hence, the speed of clutch engagement is determined by the position of accelerator pedal 90. If, at the moment of clutch plate engagement when valve 85 moves to closed position, the groove 93 of valve V and passage 94 are not in registry, piston 78 of motor 42 will be stopped or arrested. If, on the other hand, said groove and passage are in registry at this time, air will escape from the left end of cylinder 77 and, hence, permit the clutch plates to move slowly, i. e., with a retarded movement into fully engaged position.

For the purpose of coordinating the operation of the clutch power unit and the gear shifting power units 19 and 20 so that the clutch will be disengaged at the time lever 54 is actuated to effect a shifting of the gears and, hence, simulate normal operation of the parts as the same are manually operated today, solenoid valve 4 is provided for controlling the vacuum connection to cylinder 77 and a novel switch is provided as a part of switch means S to control the flow of current to solenoid d. In the form shown, said switch comprises a bell crank lever 95 pivotally supported on a pivot 96 in casing 35 and electrically grounded through the latter. A roller 97 is mounted on one end of lever 95 and is yieldingly held by a spring 98 in engagement with the periphery of a disc-like member 99 which is secured to the end of shaft 55 for angular movement therewith. Said disc has a pair of spaced, radially extending humps 100 which form a saddle for roller 97 when shift control lever 54 is in neutral position, thereby permitting spring 98 to hold a contact on the opposite end of crank 95 out of engagement with a spring contact 101. The latter is mounted on and insulated from pivot pin 96 and is electrically connected by lead 102 to one end of solenoid coil d. The other end of said coil is connected to battery 43, the connection, in the illustrated embodiment, being through contacts 103 and 104 of a switch B, which will be more fully described hereinafter; and a lead 105. Thus, whenever lever 54 is being moved to or from the extremity of one of the legs of H-shaped opening 53a for effecting a desired shift of the transmission gears, switch 95, 101 will be closed as roller 97 rides up on one of the humps 100, thereby completing a circuit to solenoid d. When the latter is thus energized, valve 4 is lifted to admit vacuum to motor 42 from chamber 36 for disengaging clutch 11. When lever 54 is in its extreme forward or rearward position, it will be seen that roller 97 will engage the periphery of disc 99 and the outer face of one of the humps 100 and switch 95, 101 will be held in open position by spring 98.

A cam lever 106 which is pivotally mounted in casing 53 is adapted to engage spring contact 101 and hold the same in the full-line position illustrated in Fig. 2, i. e., normally out of engagement with contact arm 95. If it is desired to free-wheel, i. e., to disengage the clutch each time the accelerator is released independently of any shifting of the gears, lever 106 may be moved to the dotted-line position shown and thus permit contact 101 to move into constant yielding engagement with contact arm 95. Solenoid d will then be energized and valve 4 will be lifted to connect cylinder 77 with vacuum chamber 36 and manifold 34 whenever pedal 90 is released, i. e., whenever valve V is in the illustrated position.

In order that the driver may always know the position of the gears, as indicated by the position of lever 54, and in order to obviate any shifting of the gears when the clutch is engaged or when the accelerator pedal is not released, novel means are provided for preventing the movement of shift control lever 54 when the accelerator is depressed or when the vehicle engine is not running. In the form shown, said means comprise switch B which includes a stationary contact 103 and a spring contact 104, one end of which is fixedly secured to and insulated from casing 35. The lower end of spring 104 extends into a groove in a piston member 107. The inner end of piston 107 slidably extends into a bore in casing 35 which communicates with chamber 36. Said inner end of member 107 is preferably counter-bored and houses a spring 108 which normally holds said member in position to disengage contacts 103 and 104, i. e., in the dotted-line position. When chamber 36 is evacuated, member 107 is pulled inwardly by the suction against the pressure of spring 108 until contact 104 engages contact 103.

Spring contact 104 is connected by lead 105 to battery 43 and fixed contact 104 is connected by a lead 109 to one end of the coil of a small solenoid 110 in casing 53, the other end of said coil being connected to ground through said casing. The plunger of solenoid 110 is adapted to drop, when the coil thereof is deenergized, into the path of an extension 111 on lever 95 thereby preventing movement of said lever and, hence, of control lever 54. It will be seen that coil 110 will be energized for holding said plunger in the raised position illustrated only when chamber 36 is evacuated.

For the purpose of insuring disengagement of the clutch when starting the vehicle engine, when the same has been stopped while in gear, the circuit to the starting motor (not shown) includes terminals 71 and 112 of switch C, said terminals being electrically connected by member 72 only when the clutch is in disengaged position. Novel switch means are also provided in said starting motor circuit whereby the latter can be completed only when the vehicle engine is stopped, said means, as shown, comprising a switch E adapted to be actuated by the pressure in the exhaust manifold 113. Said switch comprises a pair of contacts 114 and 115 connected to terminals 112 and to the starter motor, respectively, and a bridging element 116 therefor which is mounted on the weighted end of a pivoted lever 117, the other end of which has operative engagement with the stem of a valve 118. The latter is positioned in the outlet passage of the exhaust manifold and is held in the open position illustrated by exhaust gas pressure when the engine is in operation. When the engine stops, the weighted end of arm 117 moves contact sleeve 116 into engagement with contacts 114 and 115. Thus, when the engine is stopped, the starter motor may be energized by manually depressing clutch pedal 73. It will be understood that switch 114, 115, 116 may be controlled by the pressure in the intake manifold or any other source of power which is a function of engine operation and that a switch corresponding to switch 71, 112 may be operable by the accelerator or other pedal, if desired.

Assuming the parts to be in the positions illustrated, i. e., with the engine running, the same having been started by manually operating clutch pedal 73, the transmission gears in neutral, accelerator pedal 90 in released position and the clutch in engaged position, it is only necessary when starting the vehicle in motion in low gear for the driver to move lever 54 to the left and rearwardly toward himself in the same manner in which the conventional gearshift lever is moved to place the transmission in low gear. The initial movement of lever 54 to the left moves contact sleeve 63 into engagement with contacts 67 and 68 and out of engagement with contact 69. No current can pass through these contacts, however, for operating the gear-shift mechanism, until switch 71, 74 is closed by disengagement of the clutch. During the subsequent rearward movement of lever 54 into the lower left-hand leg of H-shaped opening 53a, i. e., to low-gear position, roller 97 rides up on one of the humps 100 thus closing switch 95, 101 and hence a circuit from battery 43 through lead 105, switch B, which is held in closed position by suction in chamber 36, coil d, lead 102, switch 95, 101 and the other terminal of battery 43 through ground. Valve 4 is accordingly actuated to close the atmosphere inlet to motor 42 and connect the latter to chamber 36 and hence intake manifold 34, whereby said motor is rendered effective to disengage clutch 11 and close switch 71, 74. It will be noted that the above operation of the clutch will take place only when pedal 90 is released, thereby actuating valve V to establish communication between manifold 34 and chamber 36.

During said rearward movement of lever 54 to low-gear position, the lower end of bar 64 is moved into electrical engagement with contact 58 so that as soon as switch 71, 74 is closed by disengagement of the clutch a circuit is completed from battery 43 to solenoid a through contacts 71, 74 of switch C and contacts 70, 63 and 67 of selector switch S. Valve 1 is accordingly actuated to connect chamber 36 to chamber 29 of motor 20 and hence effect movement of diaphragm 28 toward the left. Th movement of said diaphragm is effective to move lever 15 laterally into engagement with fork 17 and to actuate switch I so that element 49 will bridge contacts 45, 46 thereby closing a circuit from battery 43 to solenoid c through contacts 71, 74 of switch C, contacts 70, 63, 68 of switch S, contacts 46, 49, 45 of switch I, contacts 57, 64, 58 of switch S and elements P, L and T of switch X. Valve 3 is accordingly actuated to establish communication between suction chamber 36 and the upper end of cylinder 21 causing piston 22 to move upwardly to the right and hence rotate shaft 25 in a counter-clockwise direction, whereby the lower end of lever 15 is shifted in the direction of arrow f to move the gears of the transmission into low gear. Forward movement of lever 15 moves plate 44 and hence contact plates L and M to the right until plate L moves out of engagement with bar P, thereby breaking the circuit to solenoid c and permitting movement of valve 3 to admit atmosphere to the right-hand end of cylinder 21. The pressures in opposite ends of cylinder 21 are thus equalized and piston 22 is arrested with the transmission in low gear.

The above-described disengagement of the clutch and shifting of the gears are effected during the first portion of the rearward movement of lever 54 from neutral into low-gear position, and continued movement of the latter permits roller 97 to ride down off the crest of hump 100 and hence permit spring 98 to open the circuit to solenoid d at switch 95, 101, whereupon valve 4 is moved to its lowered position to admit atmospheric pressure to the right-hand end of cylinder 77 and permit engagement of clutch 11. The engaging movement of the clutch is varied and controlled by motor 42 in the manner hereinbefore fully described and the car moves forward in low gear at a speed dependent upon the depression of accelerator pedal 90.

Since the illustrated gear shifting mechanism is old, per se, and is commercially produced today, and in view of the fact that the same constitutes no part of the present invention, it is not believed to be necessary to describe in further detail the operations thereof in shifting from one gear to another.

If desired, selector switch S may include the structure illustrated in Fig. 3 in lieu of that shown in Fig. 2. Parts of the switch means of Fig. 3 which have corresponding parts in Figs. 1 and 2 are designated by corresponding primed numerals. For example, the shift control lever which is operable in the H-shaped opening 53b in the selector switch housing is designated 54' in Fig. 3. In the embodiment shown in Fig. 3, the inner end of rod 55' is counterbored and slidably supported by a pin 119 secured to casing 53', and lever 54' is pivotally mounted on an upwardly extending arm 120 formed integrally with rod 55'. The pivotal movement of lever 54' is limited by projecting portions 121 and 122 which engage a sleeve fixedly mounted on rod 55'. Secured to lever 54' and grounded through casing 53' is a spring contact 124 which is adapted to engage a contact sleeve 125 mounted on and insulated from rod 55'. Sleeve 125 forms a conducting bridge between contact 124 and a contact arm 126 that slidably engages said sleeve and is connected to lead 102' which is in turn connected to solenoid d. Lever 54' is normally held in the dotted-line position with contacts 124 and 125 out of engagement by a spring 123. Motor 42 may thus be rendered effective to disengage clutch 11 at any time when the accelerator pedal is released by moving lever 54' to the full-line position relative to rod 55'. Although said rod and lever 54' are shown in their extreme left-hand positions for shifting into low or reverse gear, it will be understood that the same are normally held in their extreme right-hand positions for shifting into second or high gear by spring 65' as described above in connection with selector switch S. It will be noted that the slots of opening 53b and arm 120 are sufficiently wide to permit pivotal movement of lever 54' to operate switch 124, 125 and cause clutch disengagement irrespective of whether said lever is in neutral or a gear selecting position. As shown in Fig. 2, selector switch S may be mounted on the vehicle steering column in such position that control lever 54 or 54' may be actuated by the driver without removing his hand from the steering column.

There is thus provided a novel control system for a motor vehicle wherein power means are provided for controlling the operations of the clutch and change speed transmission of a motor vehicle, said system being so constructed that the operation and control thereof simulate conventional manual operation of the clutch and gears, thereby obviating any confusion in the mind of a driver who is used to such manual operation. Said system comprises a novel combination of means whereby the automatic disengagement of the clutch is dependent upon release of the accelerator pedal but wherein disengagement of the clutch is not effected merely by release of said pedal unless the driver so wills. The shifting of the gears in said novel system is also dependent upon the release of the accelerator pedal as well as upon disengagement of the clutch. Novel means are also provided for preventing movement of the gear selector lever when the accelerator is depressed or when the vehicle motor is inoperative.

Although only two embodiments of the invention have been illustrated and described in detail, it is to be expressly understood that the same is not limited thereto. For example, different types of motors may be employed, any of various well-known means may be provided for controlling the engaging movement of the clutch, and other suitable types of valves and switches may be employed. It will be understood that any suitable adjusting means, such as screw 140, may be provided for limiting the closing movement of the throttle valve of carburetor 89 and that means, such as turn-buckle 141, may be provided for adjusting the length of the rods connecting valve piston 87 and lever 88 to thereby vary the relative positions of valve cylinder 86 and piston 87 for a given position of accelerator pedal 90. Slot 93 may be so formed as to register with passage 94 at all times, if desired, and thereby constitute a permanent air bleed for the left end of cylinder 77. Various other changes may also be made in the design and arrangement of parts illustrated without departing from the spirit and scope of the invention as will now be apparent to those skilled in the art. For a definition of the limits of the invention, reference will be had primarily to the appended claims.

What is claimed is:

1. In combination with the accelerator, clutch and change speed gearing of a motor vehicle, fluid pressure power means for disengaging said clutch, fluid pressure power means for shifting said gearing, a source of sub-atmospheric pressure, means connecting said source and said power means including a common conduit and branch conduits from the latter to each of said power means, valve means operable by said accelerator for controlling flow in said common conduit, valve means in each of said branch conduits for controlling flow therethrough, solenoids for operating said last-named valve means, a source of electric energy, means connecting said source of electric energy and said solenoids, said last-named means including a pair of switches having a common operating member, and means controlled by the pressure in said common conduit for holding said member against movement for operating said switches.

2. In an automotive vehicle having a throttle, a clutch and a change speed transmission, the combination therewith of power means for shifting the gears of said transmission, power means for disengaging the clutch, common means for controlling the operation of both of said power means, and means for locking said common means against movement when said throttle is in open position.

3. In an automotive vehicle having a clutch, an accelerator and change speed gearing, the combination of means for shifting said gearing, control means for said shifting means including a member having a neutral position and a plurality of gear selecting positions, means rendered operative for disengaging said clutch when said member is moved from one of said positions to another, means for rendering said shifting means operative only when said clutch is disengaged, and means for rendering said clutch disengaging means operative only when said accelerator is released.

4. In an automotive vehicle having a clutch and change speed gearing, the combination of means for shifting said gearing, control means for said shifting means including a member having a neutral position and a plurality of gear selecting positions, means rendered operative for disengaging said clutch when said member is moved from one of said positions to another, and means for rendering said shifting means and said clutch disengaging means operative only when said accelerator is released.

5. In a motor vehicle having an accelerator, a clutch and a change speed transmission, the combination therewith of power means for shifting the gears of said transmission, power means for disengaging the clutch, a source of suction, an accelerator operated valve for controlling communication between said source and both of said power means, and valves controlling communication during normal operation between said source and each of said power means.

6. In a motor vehicle having change speed gearing, the combination of fluid pressure power means for shifting said gearing, valve means for controlling the flow of fluid pressure to and from said power means, electro-magnetic means for actuating said valve means, a source of electric energy, means connecting said electro-magnetic means and said source including switch means, fluid pressure operated means for controlling the operation of said switch means, and accelerator operated means for controlling said fluid pressure operated means.

7. The combination with the change speed transmission, the clutch and the starter mechanism of a motor vehicle of power means for shifting the gears of said transmission, means connecting said power means with a source of suction, valve means in said connecting means for controlling flow therethrough, electro-magnetic means for operating said valve means, a source of electric energy, means connecting said starter mechanism and said electro-magnetic means to said source of electric energy including switch means operated by said clutch, and means responsive to the pressure in the exhaust manifold for interrupting the connecting means between said starter mechanism and said source when the vehicle engine is operative.

CHARLES A. BREWER.